United States Patent
Sheets et al.

(10) Patent No.: US 7,175,788 B2
(45) Date of Patent: Feb. 13, 2007

(54) DEVICE AND METHOD FOR REMOVAL OF PREFORMS

(75) Inventors: Philip Sheets, York, PA (US); Jim Dunman, Conowingo, MD (US)

(73) Assignee: Graham Packaging Company, L.P., York, PA (US)

( * ) Notice: Subject to any disclaimer, the term of this patent is extended or adjusted under 35 U.S.C. 154(b) by 313 days.

(21) Appl. No.: 10/948,673

(22) Filed: Sep. 24, 2004

(65) Prior Publication Data

US 2006/0068051 A1   Mar. 30, 2006

(51) Int. Cl.
    *B29C 45/40* (2006.01)
(52) U.S. Cl. ............... 264/39; 264/334; 241/101.4; 425/190; 425/215; 425/317; 425/436 RM
(58) Field of Classification Search ........ 425/137, 425/190, 215, 317, 436 R, 436 RM; 241/101.2, 241/101.3, 101.4; 264/39, 334
    See application file for complete search history.

(56) References Cited

U.S. PATENT DOCUMENTS

| 4,025,261 | A | * | 5/1977 | Rutkowski et al. | ......... 425/139 |
| 4,187,267 | A | * | 2/1980 | Fisher et al. | ............... 425/137 |
| 4,200,428 | A | * | 4/1980 | Andrews | .................... 425/136 |
| 5,391,332 | A | * | 2/1995 | Campbell et al. | ............ 264/39 |
| 5,556,649 | A | * | 9/1996 | Sumioka et al. | ............ 425/215 |
| 6,189,701 | B1 | * | 2/2001 | Winter | ....................... 209/523 |

* cited by examiner

*Primary Examiner*—Robert B. Davis
(74) *Attorney, Agent, or Firm*—Venable LLP; James R. Burdett; Stuart I. Smith

(57) ABSTRACT

A device for fracturing a defective preform for use in blowmolding is claimed. The preform has head end and a tail end and the device comprises a tube with walls defining a cavity for accepting the defective preform while the defective preform is on a core of an injection molding apparatus, an attachment element that attaches the tube to the injection molding apparatus, and locates the tube relative to the core; and a percussion instrument that contacts and breaks the defective preform at the tail end of the preform.

15 Claims, 6 Drawing Sheets

DEVICE AND METHOD FOR REMOVAL OF PREFORMS

BACKGROUND OF THE INVENTION

1. Field of the Invention

The present invention relates generally to defective preforms and more particularly to removal of defective preforms from an injection molding apparatus.

2. Related Art

Preforms created in the injection molding process are sometimes defective in that they cannot be easily removed from the core of the injection molding apparatus over which the preforms are shaped. One common example is when the plastic does not form the entire preform. In this instance the preform does not cover the core and cannot be removed from the core using the mold ejector plate. As a result, the defective preform must be cooled and struck at its bottom end with a hammer, such as a brass or aluminum hammer in order to crack the plastic and remove the preform from the core.

Most cores are made from steel and have sufficient hardness to withstand the impact of being struck with a hammer. The benefit of an ampcoloy core is that it decreases cycle times of molds by allowing the plastic to cool faster. However, ampcoloy cores are softer than steel and are very susceptible to damage when struck with a hammer. Using a hammer to remove a defective preform creates a likelihood that the core will bend when struck. A bent core cannot be straightened, so it must be replaced at significant cost.

Thus there is a need in the art for a mechanism for removal of defective preforms from the core of an injection molding apparatus which does not risk damaging the core.

One difficulty in using a brass hammer, regardless of the core with which it is used, it that the defective preform must be struck with just the right force. This may require multiple attempts. There is also a chance that the plastic will shatter, making clean-up tedious, time consuming, and potentially dangerous. Further, the process requires the use of manpower, which increases costs. The longer it takes to remove and clear a defective preform, the less time the molding apparatus is in use. This loss of time results in lower productivity, and ultimately, a reduction in efficiency.

Another device known in the art is a platen, which is a plate with a series of holes, corresponding to the location of the cores upon which the preforms are molded. To remove a defective preform, the large platen must be placed over all the cores that are in the assembly, adjusted to fit the cores tightly, and then the platen is forcefully pulled down to remove the defective preform. The problem with this method is that is requires alignment of the platen with multiple cores, the platen is large and cumbersome, and if the platen is not pulled down at the proper angle, the ampcoloy core can bend. Furthermore, platens are heavy, and require the use of an additional machine to put the platen into place and to remove it.

Thus there is also a need for a removal device and method of removal of individual defective preforms that is time efficient and requires minimal manual operation.

BRIEF SUMMARY OF THE INVENTION

The present invention is a device for fracturing defective preforms and the method of their removal. Specifically, the invention is a device for fracturing a defective preform for use in blowmolding, the preform having a head end and a tail end. The device includes a tube with walls defining a cavity for accepting the defective preform when the defective preform is on a core of an injecting molding apparatus. The device further includes an attachment element that attaches the tube to the injection molding apparatus. The attachment element locates the tube relative to the core. The device also has a percussion instrument for contacting and breaking the preform at the tail end of the preform.

In an exemplary embodiment, the percussion instrument moves during the contacting and breaking in a direction that is aligned with an axis of the core. The percussion instrument can be pneumatically driven into the preform.

In another embodiment, the device is connected to an air supply and a valve. When the valve is in an open position, air is delivered to the device, driving the percussion instrument into contact with the preform. In a further embodiment, the device can include a stop to limit a range of motion of the percussion instrument. In yet another embodiment, the stop limits the range of motion to a thickness of the preform.

In an alternate embodiment, the device can include a spring and a mechanism for releasing the spring, where activation of the mechanism and release of the spring drives the percussion instrument into the defective preform. In one embodiment, the percussion instrument is driven into the preform manually. In another embodiment, the attachment element of the device is a collar adapted to sit on a thread split of the injection molding apparatus.

The invention also speaks to a method for fracturing a defective preform from an injection molding apparatus. The method includes attaching a preform-fracturing device to the injection molding apparatus using an attachment element of the device. The device is adapted to fit over the defective preform when the preform is on the core of the injection molding apparatus. The method also includes driving a percussion instrument located at least partially within the device into contact with the preform, and fracturing the defective preform.

In an exemplary embodiment, the percussion instrument moves in a direction aligned with an axis of the core. In another embodiment, the percussion instrument is driven by air. In a further embodiment, the percussion instrument is driven by a spring. In yet another embodiment, the percussion instrument is driven by striking the percussion instrument with a hammer.

The present invention is superior to known devices in that it allows for the use of ampcoloy cores in the injection molding process. Ampcoloy has been used for years in the plastic industry because it decreases the cycle time of molds by allowing the plastic to cool more quickly and is slowly being implemented in the plastic preform injection industry. One problem hindering the incorporation of ampcoloy into the preform injection industry is cost. Though the price of an ampcoloy core in itself is reasonable, the cost for replacing these softer cores can be prohibitive. The present invention improves upon the prior art practice of using brass hammers and the like to remove defective preforms. By eliminating one of the chief causes of core damage—removal of defective preforms—the invention allows for the practical use of ampcoloy cores. Most important, the invention provides a superior, cost-effective method with which to remove defective preforms.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention. All references cited herein are incorporated by reference as if each had been individually incorporated.

To appreciate the workings of the present invention, it is necessary to first understand the removal process for a fully-developed, functional preform.

Figure 1:
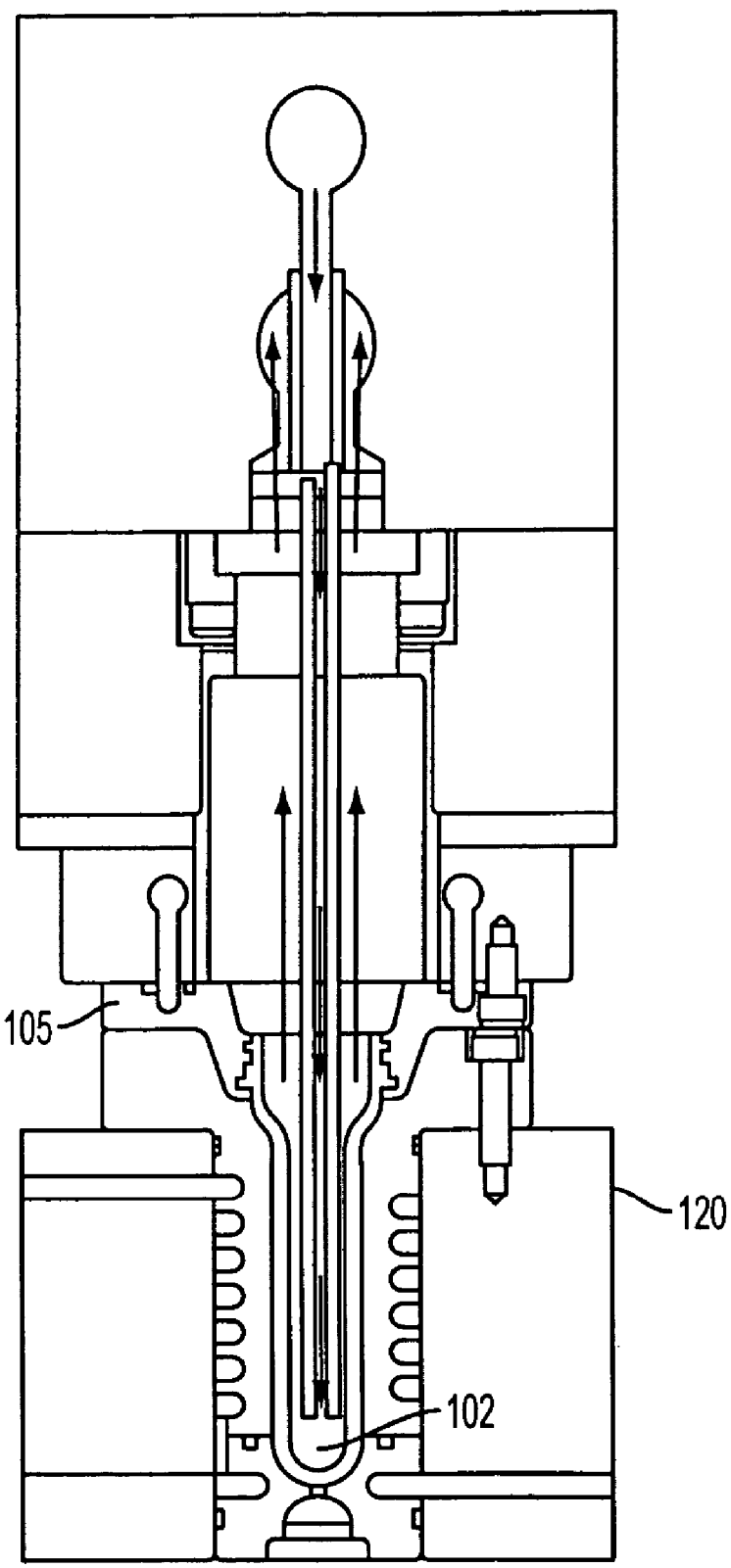
FIG. 1 depicts a completely developed preform on the core of an injection molding apparatus, with the cavity plate attached.
Figure 2:
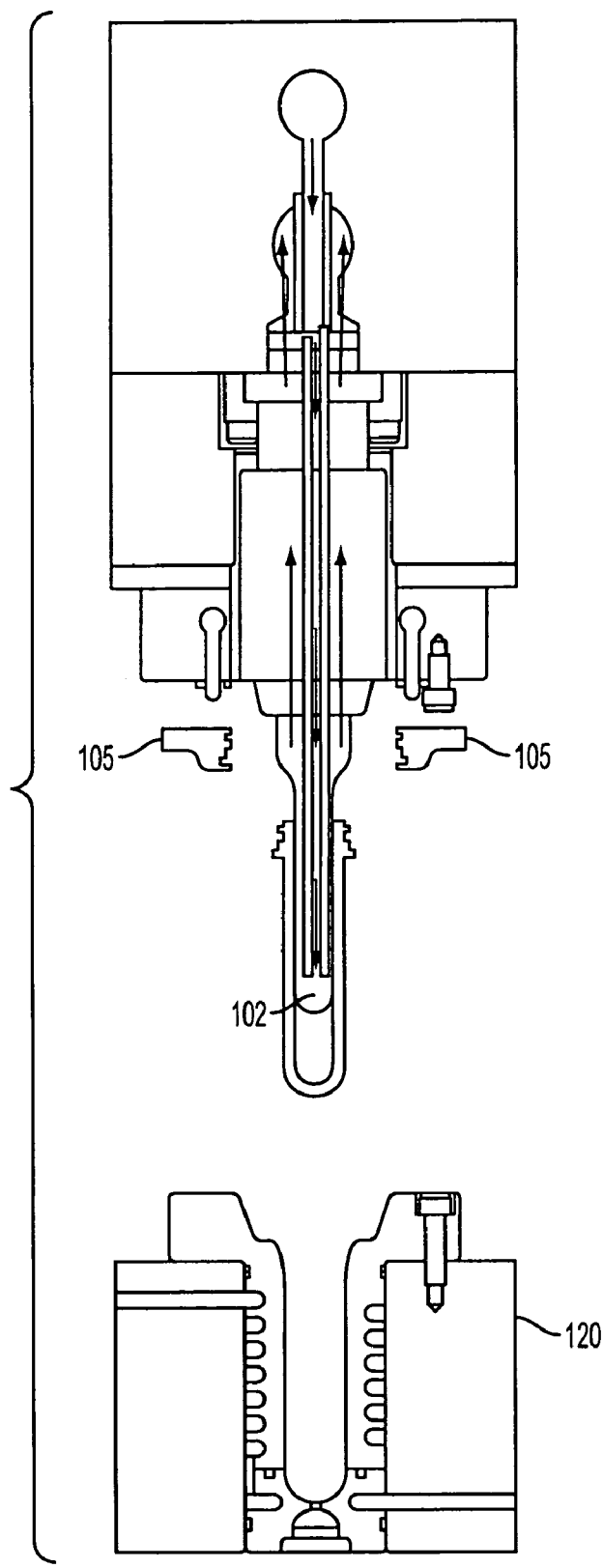
FIG. 2 depicts the release by the injection molding apparatus of a completely developed preform, where the cavity plate is detached.

FIG. 1 illustrates an injection molding apparatus having a completely formed preform upon the core 102. Removal occurs by the cavity plate 120 sliding away and separating from the remainder of the assembly (see FIG. 2). The thread splits 105 then slide down (away from the injection molding apparatus) and retract (slide out horizontally) from the sides of the preform. This releases the preform. (For clarity, the mechanism attaching the thread splits to the molding apparatus has been omitted.)

Figure 3:
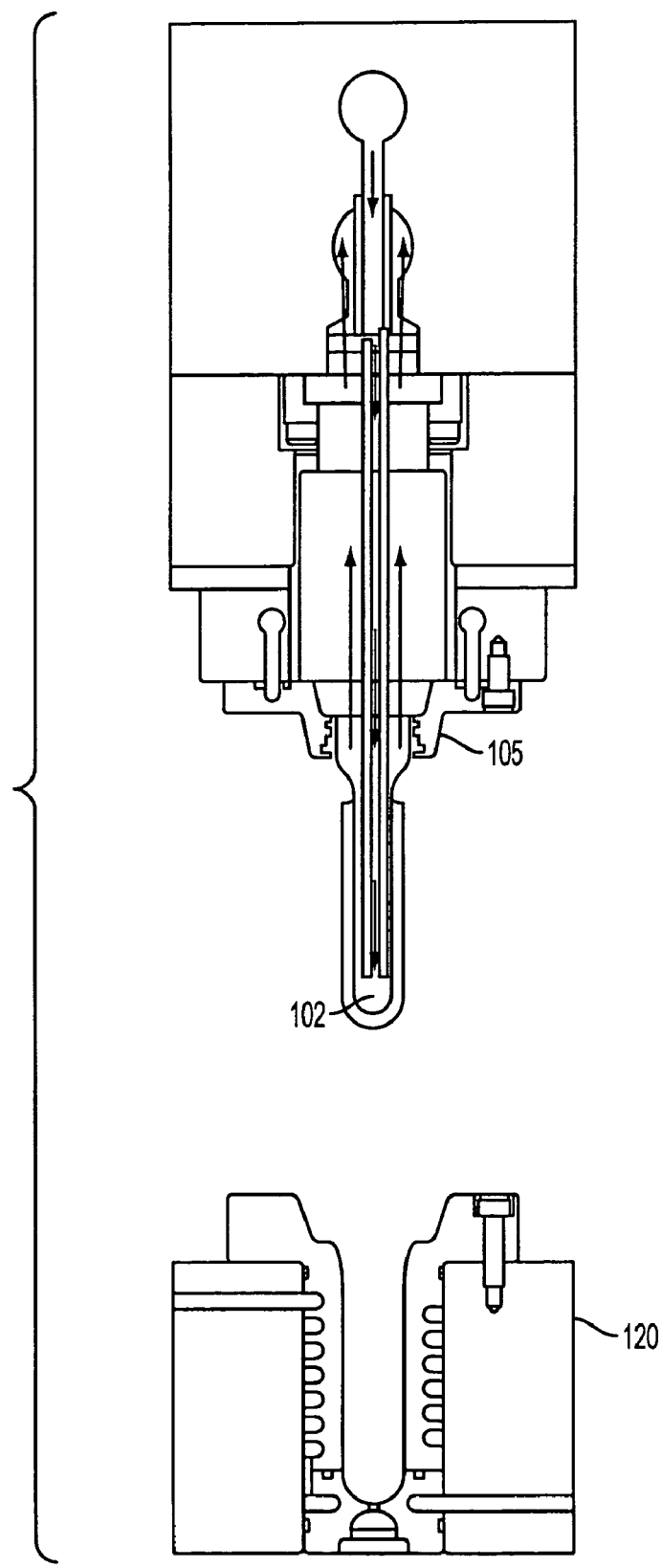
FIG. 3 depicts a defective preform on the core of an injection molding apparatus after the cavity plate is removed.

A defective preform is any preform that cannot be ejected from the injection molding apparatus—a preform that is stuck on the core. In particular a defective preform is one that is insufficiently formed. Defective preforms are difficult to remove because they do not form entirely over the core and cannot be ejected. The defective preform in FIG. 3 does not continue into the threaded area of the core. Thus when the thread splits 104 retract, the preform does not fall away from the core 102.

Figure 4:
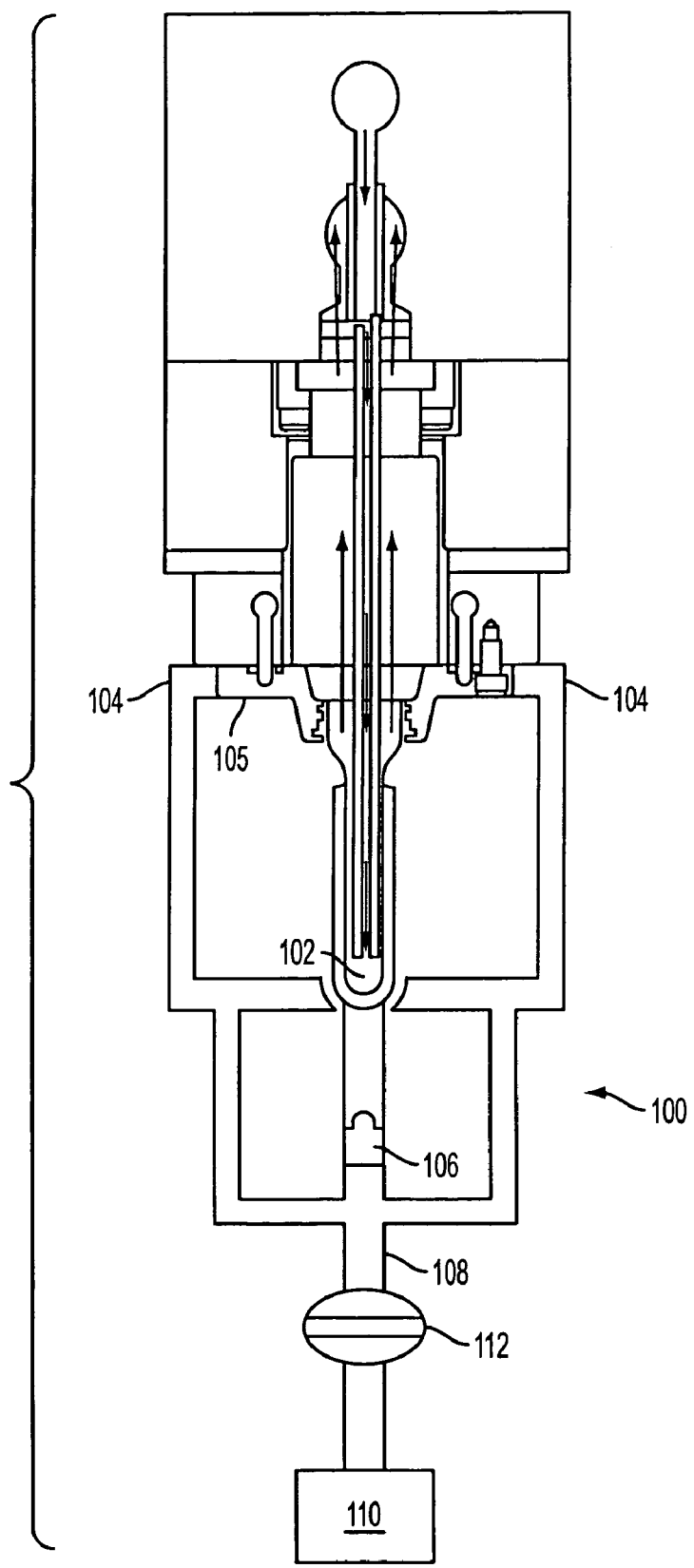
FIG. 4 depicts an exemplary embodiment of the invention when attached to an injection molding apparatus with a defective preform on the core.

As shown in FIG. 4, the preform-fracturing device of the present invention fits over, for example, an ampcoloy core of an injection molding apparatus. The invention is also suitable for use with other cores, such as steel. The device 100 attaches to the core 102 by at attachment means 104. The attachment means 104 can be any mechanism for attaching the device 100 to the core 102, such as, a clip, suction cup, a clamp, and the like. In an exemplary embodiment, the attachment means 104 is an adjustable collar. The collar 104 can sit, for example, on the thread split 105 of the injection molding apparatus. The collar is then adjusted to come into contact with the tail end of the defective preform. Now the core and defective preform are contained within the device.

In FIG. 4 a percussion instrument 106 is situated below the core 102 that is driven into a defective preform that has been molded over the core 102. The percussion instrument 106 is aligned with an axis of the core. In the illustrated embodiment, the percussion instrument 106 is aligned with the vertical axis of the core.

Also depicted in FIG. 4 is a connection 108 from the device 100 to an air supply 110 and a valve 112. Here the valve 112 is in the closed position, and the percussion device 106 is stationary. When the valve 112 is in the open position, air rushes through the connection 108, to the percussion instrument 106, driving the percussion instrument 106 into the defective preform.

Figure 5:
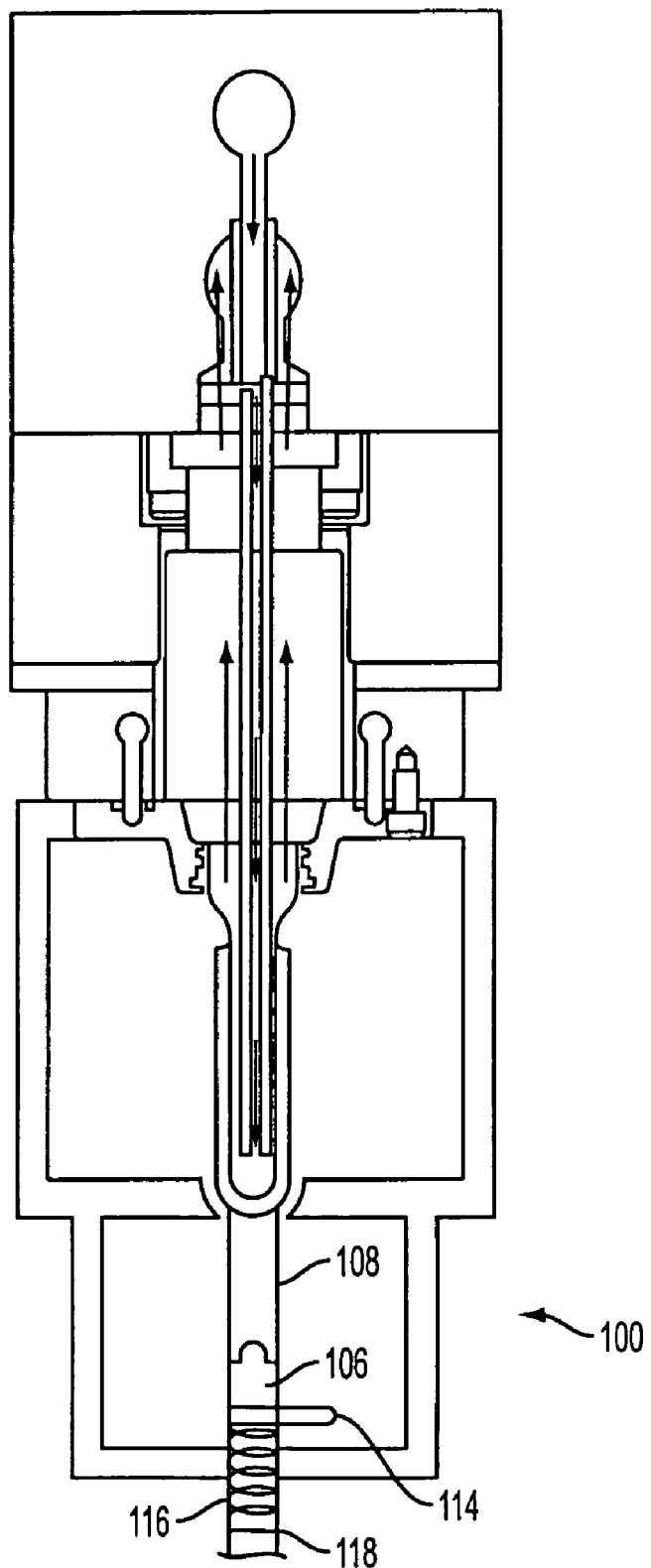
FIG. 5; depicts an additional embodiment of the present using a spring.

The percussion instrument 106 may be driven by a means other than air. For example, the percussion instrument 106 may be driven manually. Another embodiment of the invention comprises a spring 116, a mechanism for releasing the spring 114, such as a lever, button, cord, switch, etc, and a stop 118. (See FIG. 5) When the release mechanism 114 is activated, the spring 116 releases, driving the percussion instrument 106 into the preform.

Figure 6:
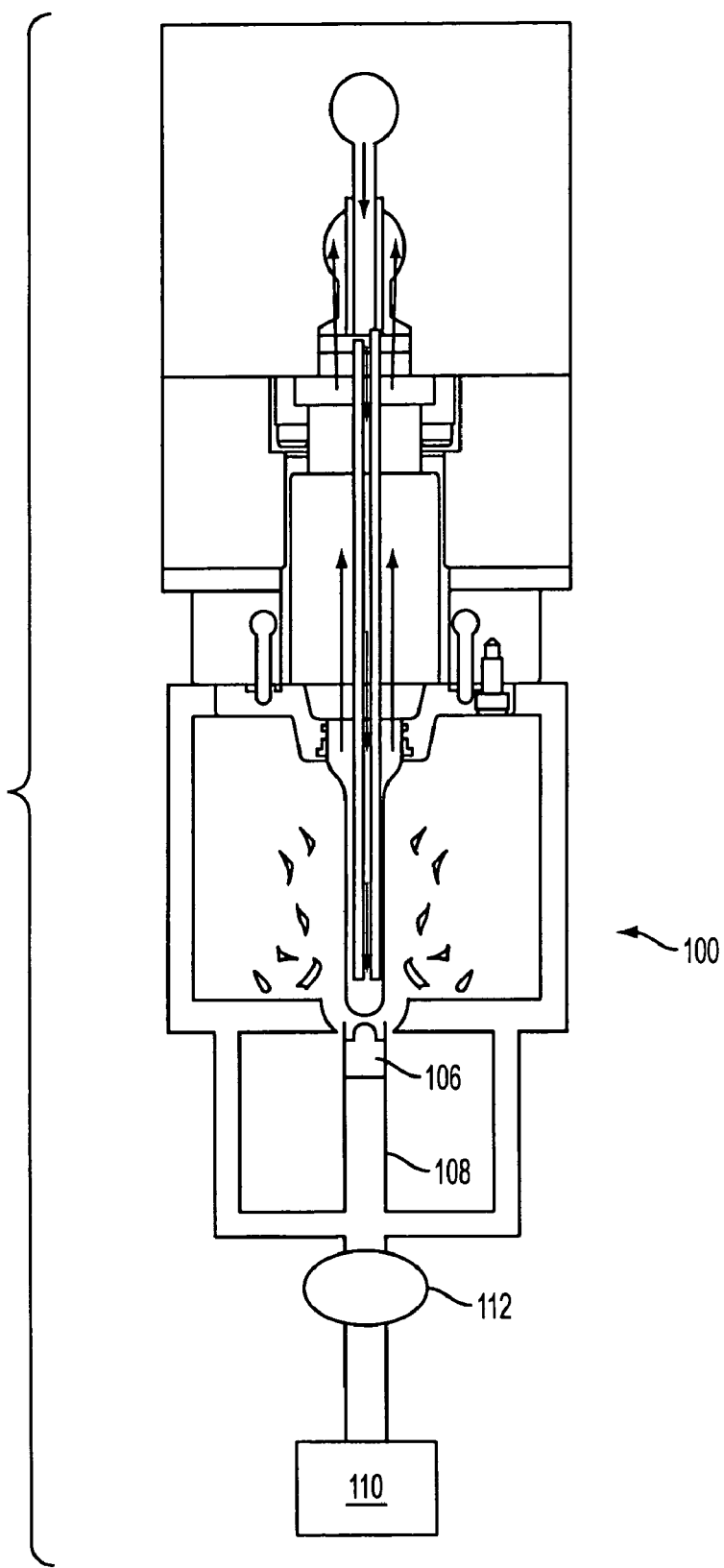
FIG. 6 depicts an exemplary embodiment of the invention when the percussion instrument contacts and fractures the defective preform.

When the percussion device 106 is propelled forward by, for example, air, the percussion instrument 106 contacts the defective preform at the tail end of the preform and shatters the preform in pieces (See FIG. 6). The present invention contemplates embodiments where the percussion instrument 106 stops after striking the preform and before reaching the core 102, as well as embodiments where the percussion instrument 106 comes into contact with the core 102. In FIG. 6, all of the pieces have fallen off the core 102, but it is also possible that some pieces will still be loosely attached to the core 102. Though still attached, these pieces can be easily removed. The shattered pieces are contained within the preform fracturing device 100. Upon removal of the device 100, the broken preform/pieces can be discarded.

The present invention is superior to known devices in that it eliminates the problem of core bending and the cost of replacement. One of the ways this is accomplished is that, in a preferred embodiment, the tail end of the core is hit. When the percussion instrument is aligned with the longitudinal axis of the core, the direction at which the core is struck minimizes the chances for any bending. The present invention allows for striking the core in this position. In contrast, it can be difficult to locate a hammer in this precise position.

Another advantage of the present invention is that the device is easier to handle than a platen. The device would also allow for those with a limited space in which to utilize a hammer to easily clear a defective preform. Additionally, thread splits 105 would not have to be in the fully retracted position, as required when using a platen. When the thread splits 105 are retracted, there is the possibility that warm plastic can move into the indentation area of the core that corresponds to the preform threads, preventing the thread splits from closing. If the thread splits cannot close, a subsequent preform cannot be created. In order to resume manufacture, the plastic stuck underneath the thread splits would have to be removed. Thus, the elimination of the need to retract the thread splits in order to remove the defective preform makes the process of manufacture more efficient.

Another major advantage of the invention is that it is safer to use than devices currently known in the art. When a defective preform is manually struck with a hammer, the plastic shatters into pieces which are often sharp and can cut the individual attempting the clear the defective preform. Because the present invention fits over a portion of the injection molding apparatus to contain the preform, when the preform is struck by the percussion device 106 the shattered plastic stays within the fracturing device 100. The danger of being cut by shattered fragments is eliminated.

Perhaps the most notable advantage of the preform-fracturing device 100 is the time saved. The attachment of the device 100 to a single defective preform as needed, the elimination of the need for a brass hammer, and the easy clean up and removal saves precious time in the manufacturing process—an hour in many cases. The ability to resume preform manufacture for this time period increases productivity and reduces time and money loss.

To appreciate the claimed invention, the core of the injection molding device need not be made of amploy. The simple elimination of the need for a brass hammer directly contacting a defective preform is a significant improvement over the prior art, as hammer use requires precision that is difficult to achieve. The process of using a hammer can be tedious and time consuming. Positioning can be problematic, and it may take multiple attempts to achieve the right amount of force to shatter the preform without damaging the core. There is also the possibility of being injured by shattered plastic. The use of the present invention eliminates or reduces these disadvantages.

Of course, a brass hammer may be used in conjunction with the invention, for example, to propel the percussion device into the tail end of a defective preform. In this embodiment, advantages of the invention are still realized.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

What is claimed is:

1. A device for fracturing a defective preform for use in blowmolding, the preform having a head end and a tail end; the device comprising:
    a tube with walls defining a cavity for accepting the defective preform while the defective preform is on a core of an injection molding apparatus;
    an attachment element that attaches the tube to the injection molding apparatus, the attachment element locating the tube relative to the core; and
    a percussion instrument for contacting and breaking the defective preform at the tail end of the preform.

2. The device of claim 1, wherein the percussion instrument moves during the contacting and breaking in a direction that is aligned with an axis of the core.

3. The device of claim 1, wherein the percussion instrument is pneumatically driven into contact with the defective preform.

4. The device of claim 3, further comprising a connection to an air supply and a valve, such that when the valve is in an open position, air is delivered to the device, driving the percussion instrument into contact with the defective preform.

5. The device of claim 1, further comprising a stop to limit a range of motion of the percussion instrument.

6. The device of claim 5, wherein the stop limits the range of motion to a thickness of the preform.

7. The device of claim 1, further comprising a spring and a mechanism for releasing the spring, wherein activation of the mechanism and release of the spring drives the percussion instrument into contact with the defective preform.

8. The device of claim 1, wherein the percussion instrument is driven manually.

9. The device of claim 1, wherein the attachment element is a collar adapted to sit on a thread split of the injection molding apparatus.

10. A method for fracturing a defective preform comprising placing the device of claim 1 over the core of the injection molding apparatus and driving the percussion instrument into contact with the preform.

11. A method for removal of a defective preform from an injection molding apparatus, the method comprising:
    attaching a tube of a preform fracturing device to the injection molding apparatus via an attachment element of the preform fracturing device, the tube being adapted to fit over the defective preform when the preform is on a core of the injection molding apparatus; and
    driving a percussion instrument located at least partially within the tube into contact with the preform and fracturing the defective preform.

12. The method of claim 11, wherein the percussion instrument moves in a direction aligned with an axis of the core.

13. The method of claim 11 wherein the percussion instrument is driven by air.

14. The method of claim 11 wherein the percussion instrument is driven by a spring.

15. The method of claim 11 wherein the percussion instrument is driven by striking the percussion instrument with a hammer.

* * * * *